United States Patent
Bobde et al.

(10) Patent No.: US 7,552,204 B2
(45) Date of Patent: Jun. 23, 2009

(54) METHOD AND SYSTEM FOR SUPPORTING THE COMMUNICATION OF PRESENCE INFORMATION AMONG COMPUTING DEVICES OF A NETWORK

(75) Inventors: Nikhil P. Bobde, Bellevue, WA (US); Jeremy Buch, Redmond, WA (US); Ajay Chitturi, Bellevue, WA (US); Ann Demirtjis, Redmond, WA (US); Vishwajith Kumbalimutt, Redmond, WA (US); David J. Simons, Redmond, WA (US); Zachary Taylor, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1316 days.

(21) Appl. No.: 10/146,166

(22) Filed: May 15, 2002

(65) Prior Publication Data

US 2003/0217099 A1    Nov. 20, 2003

(51) Int. Cl.
*G06F 15/173* (2006.01)
*G06F 15/16* (2006.01)
(52) U.S. Cl. ...................... 709/223; 709/202
(58) Field of Classification Search ............ 709/229, 709/242, 204, 207, 205, 206, 202, 224, 9, 709/223; 726/2; 455/558, 41.2, 411, 419, 455/435.1; 707/10, 5; 395/200.59
See application file for complete search history.

(56) References Cited

U.S. PATENT DOCUMENTS

| | | | | |
|---|---|---|---|---|
| 5,737,886 A | * | 4/1998 | Kruckemeyer | ............... 283/67 |
| 5,802,518 A | * | 9/1998 | Karaev et al. | .................. 707/9 |
| 6,510,461 B1 | * | 1/2003 | Nielsen | ..................... 709/224 |
| 6,853,634 B1 | * | 2/2005 | Davies et al. | ............... 370/349 |
| 6,870,830 B1 | * | 3/2005 | Schuster et al. | ............. 370/352 |
| 7,227,937 B1 | * | 6/2007 | Yoakum et al. | ........ 379/201.01 |
| 7,359,938 B1 | * | 4/2008 | Davies et al. | ............... 709/204 |
| 2002/0087704 A1 | * | 7/2002 | Chesnais et al. | ............ 709/228 |
| 2003/0048195 A1 | * | 3/2003 | Trossen | .................. 340/825.49 |
| 2003/0217099 A1 | * | 11/2003 | Bobde et al. | ................. 709/202 |
| 2004/0210662 A1 | * | 10/2004 | Lim et al. | .................... 709/229 |

FOREIGN PATENT DOCUMENTS

WO    WO 03/061236 A1 *   1/2002

OTHER PUBLICATIONS

RFC "SIP Session Initiaton Protocol" 1999, 1-105.*
Adam Roach, *Automatic Call Back Service in SIP*, Internet Engineering Task Force, Internet Draft, pp. 1-7, (Mar. 2000).

(Continued)

*Primary Examiner*—Larry D Donaghue
*Assistant Examiner*—Karen C Tang
(74) *Attorney, Agent, or Firm*—Perkins Coie LLP

(57) ABSTRACT

A method and system for aggregating presence information generated by multiple devices associated with a single user is presented. A server acting as a presence agent on behalf of a first user and the first user's computing device receives and responds to a subscription request generated by a computing device operated by a second user that wishes to be permitted as a watcher of the first user. If the server is not capable of acting as a presence agent, then the first user's computing device assumes the role of a presence agent.

6 Claims, 14 Drawing Sheets

OTHER PUBLICATIONS

Adam Roach, *Event Notification in SIP*, Internet Engineering Task Force, Internet Draft, Ericsson Inc., pp. 1-17, (May 2001).

Rosenberg et al., *An XML Format for Presence Buddy Lists*, Internet Engineering Task Force:Internet Draft, pp. 1-9, (Jun. 2000).

Rosenberg et al., *An XML Format for Watcher Information,*, Internet Engineering Task Force:Internet Draft, pp. 1-8, (Jun. 2000).

Rosenberg et al., *A Lightweight Presence Information Format (LPIDF)*, Internet Engineering Task Force:Internet Draft, pp. 1-7, (Jun. 2000).

Rosenberg et al., *A Data Format for Presence Using XML*, Internet Engineering Task Force:Internet Draft, pp. 1-14, (Jun. 2000).

Rosenberg et al., *SIP Extensions for Presence Authorization*, Internet Engineering Task Force:Internet Draft, pp. 1-10, (Jun. 2000).

Rosenberg et al., *SIP Extensions for Instant Messaging*, Internet Engineering Task Force:Internet Draft, pp. 1-9, (Feb. 2001).

Mahy et al., *SIP Extensions for Message Waiting Indication*, Internet Engineering Task Force:Internet Draft, pp. 1-19, (Jul. 2000).

Moyer et al., *Framework Draft for Networked Appliances using the Session Initiation Protocol*, Internet Engineering Task Force:Internet Draft, pp. 1-31, (Nov. 2000).

Handley et al., *SIP: Session Initiation Protocol*, Internet RFC/STD/FYI/BCP Archives, pp. 1-105 (Mar. 1999).

Rosenberg, *A SIP Event Sub-Package for Watcher Information*, Internet Engineering Task Force:Internet Draft, pp. 1-11 (Jul. 2001).

Roach, Adam, *SIP-Specific Event Notification*, Internet Engineering Task Force:Internet Draft, pp. 1-30 (Jul. 2001).

* cited by examiner

Watcher

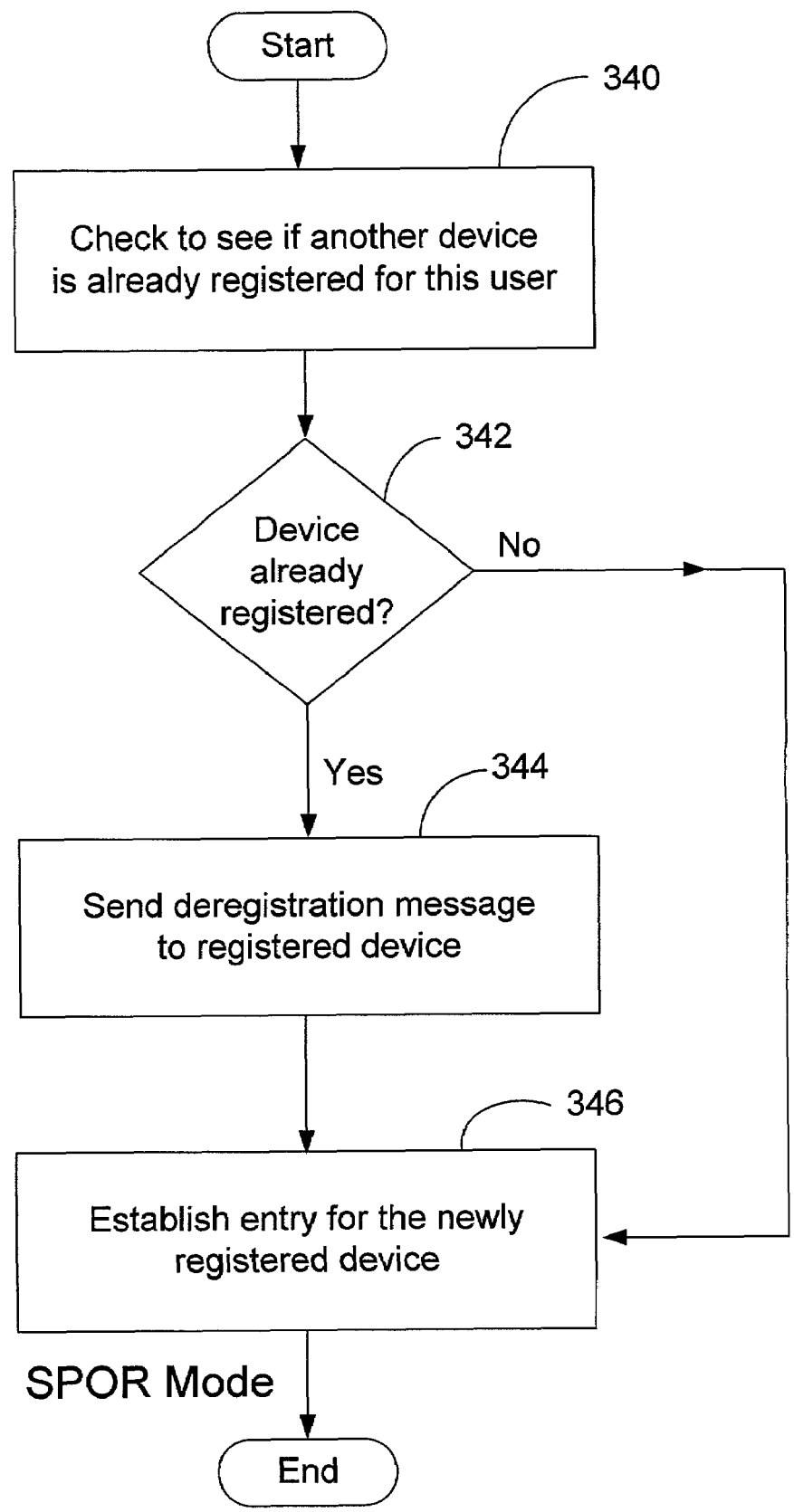

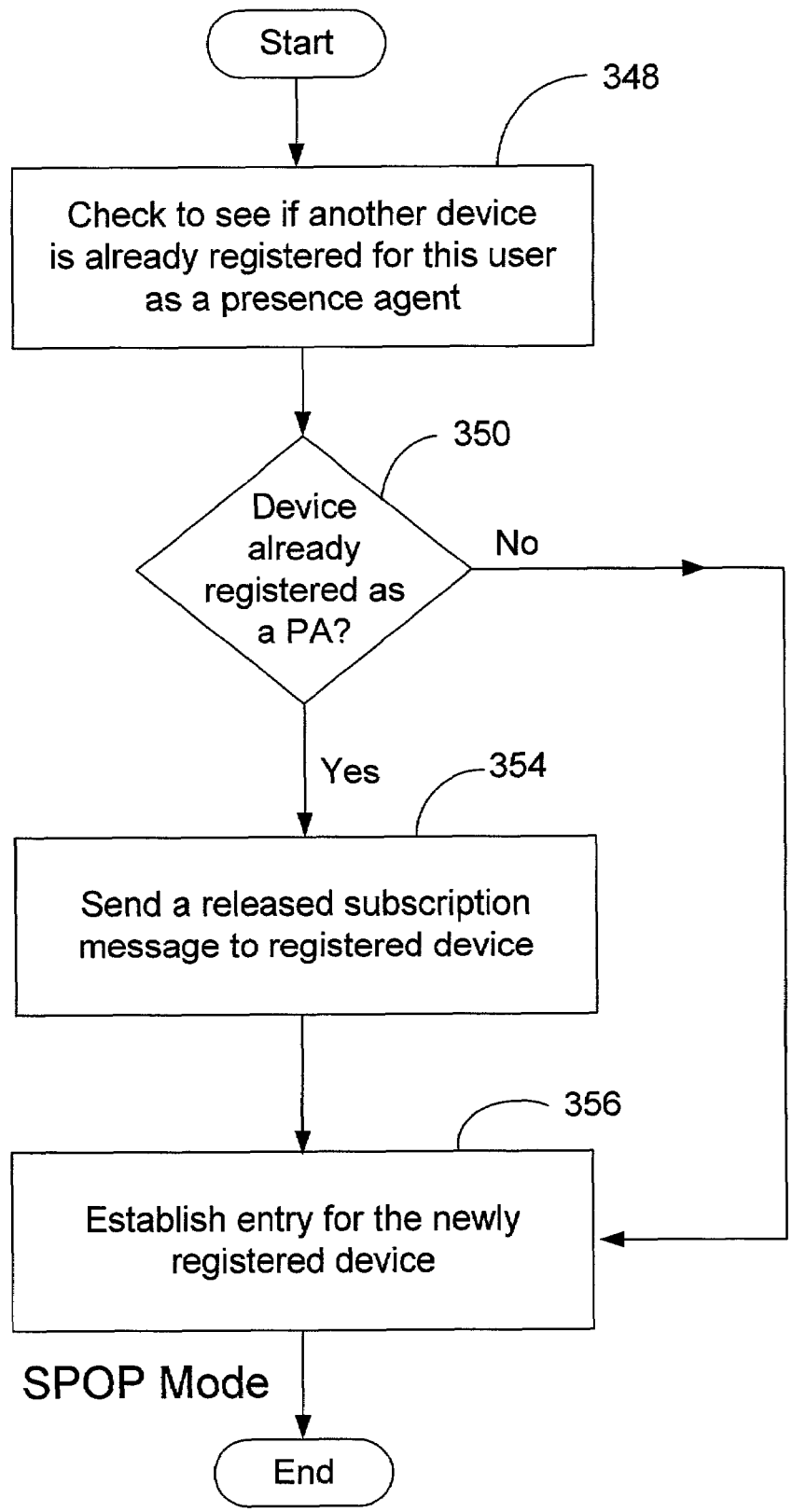

METHOD AND SYSTEM FOR SUPPORTING THE COMMUNICATION OF PRESENCE INFORMATION AMONG COMPUTING DEVICES OF A NETWORK

TECHNICAL FIELD

The invention relates generally to communication between computers over a network, and more particularly, to methods and systems for communicating the presence of one or more devices from over the network.

BACKGROUND OF THE INVENTION

With today's widespread use of the Internet as a primary communication medium, pre-existing communication devices are now being designed so that they are capable of communicating over packet-switched networks. For instance, telephones, pagers, cell phones, handheld computers, and even fax machines can now be accessed and controlled from over the Internet. Communication over a packet-switched network using communication devices that traditionally communicate over a circuit-switched telephone network is generally known as network telephony, or IP telephony when an IP network is involved.

A user having several communication devices (e.g., a cell phone, laptop and handheld PC) can configure each of these devices to identify itself to the network using a single alias or identifier (e.g., username@b.com). In this way, the user is not limited to communicating with others via a single device, but instead has the ability to communicate via several different devices. Nonetheless, the ability for a user to have several devices "present" on a computer network creates a need for other users to be able to determine the status or state of the user's many devices.

"Presence" refers to the availability, proximity, activity level or operating state of a user on a network. The ability for users to monitor each other's presence is a feature offered in connection with many applications that support network telephony. For example, instant messaging applications such as MSN or Yahoo have an "available buddy" feature, in which a user of the application can determine whether select users are available for engaging in communication. The data retrieved and returned to the buddy list, e.g. "John OFFLINE" or "Susan ACTIVE," is known as "presence information," and is generally maintained by a program called a "presence agent." According to most conventional network configurations, the presence agent is implemented as a dedicated server. Typically, the presence agent supports network telephony protocols such as the session initiation protocol (SIP). Device users can register their devices with the presence agent (e.g., via a registrar module) in order to have their presence maintained and to allow various programs on the network to facilitate network telephony services. As such, a first device user wishing to detect the presence of a second device user does so by "subscribing" with the presence agent, such as via a SIP SUBSCRIBE message. The presence agent intermediates between the first user, also known as the watcher, and the second user to facilitate the communication of the second device user's presence information to the first device user.

The ability of a presence agent to accurately determine and maintain presence information for one or more users significantly enhances communication and task completion over the network. For example, a very mobile user may only be on the network at certain times throughout the day, and may be accessing the network from varying locations. By subscribing as a watcher of this mobile user, it becomes possible for another user to detect the presence of the mobile user during the times at which the mobile user's computing device is actually connected to the network. So, when the mobile user is present, the watcher can correspond instantly with the mobile user via a chat session or videoconferencing call, as opposed to resorting to a non-real-time communication such as e-mail messaging. Hence, presence is an important factor for facilitating communication between users.

SUMMARY OF THE INVENTION

The invention presents a method and system for detecting and communicating the presence of one or more users on a computer network. This includes users who employ devices that communicate over a network via the SIP protocol, and other common network protocols.

In accordance with an embodiment of the invention, a network device, such as a server, is equipped with a presence agent that facilitates the exchange of presence information between a first user and a second user. The first user is referenced by a unique alias, such as user@some_network.com, and has one or more computing devices registered with the network server (e.g., via a registration module or dedicated registrar server). When the second device wishes to access presence information pertaining to the first user, the second user employs a computing device to send a subscription request to the network server in order to become a "watcher" of the second device user. Once received, the subscription request is then forwarded to the presence agent operating upon the network device for processing. The network device then generates and submits an acceptance message to the first user's device, followed by a standard NOTIFY message.

A server acting as a presence agent on behalf of a first user and the first user's computing device receives and responds to a subscription request generated by a computing device operated by a second user that wishes to be permitted as a watcher of the first user. If the server is not capable of acting as a presence agent, then the first user's computing device assumes the role of a presence agent.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 10-14 illustrate how the presence agent functionality can be transferred among computing devices according to various embodiments of the invention.

DETAILED DESCRIPTION OF THE INVENTION

Figure 1:
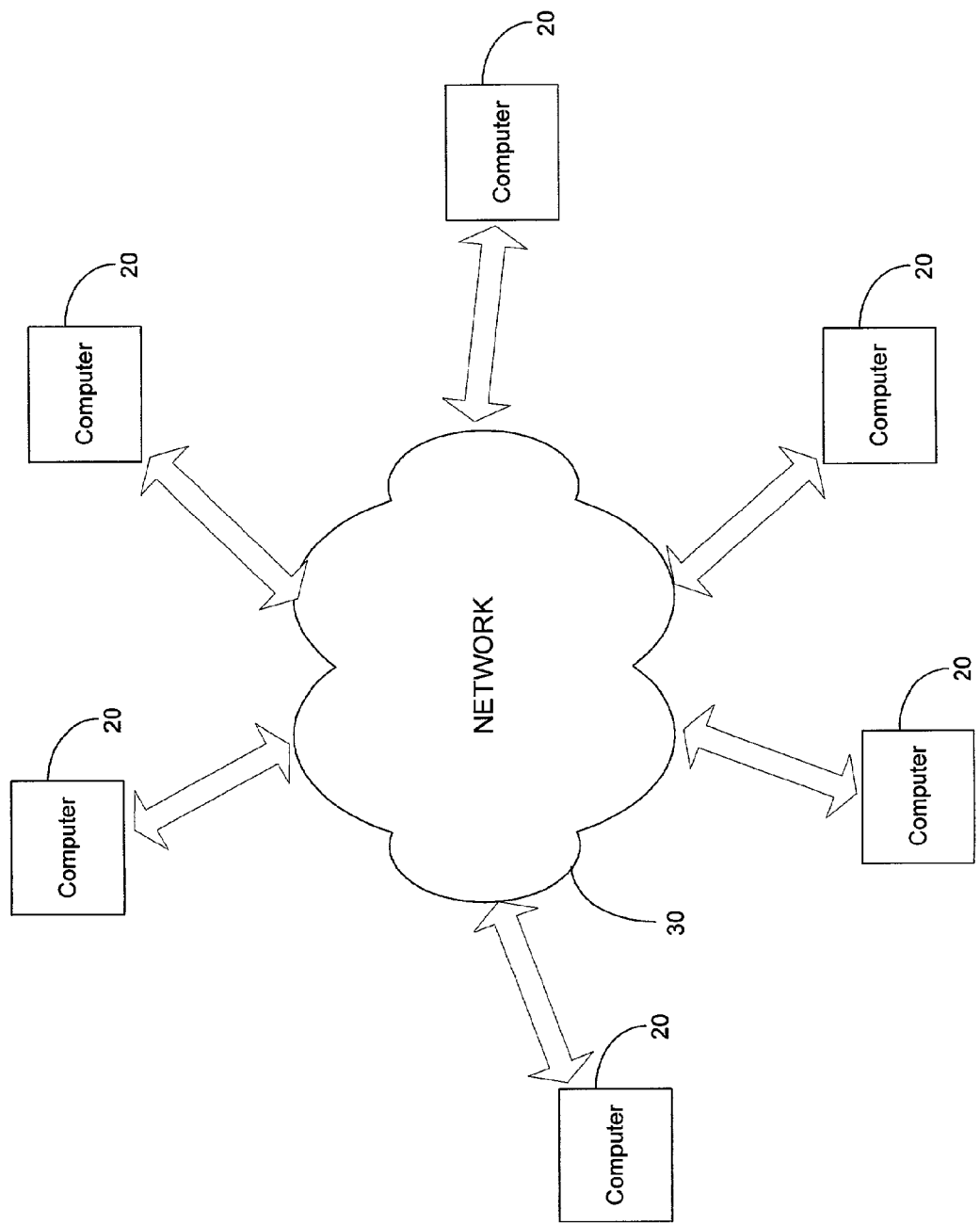
FIG. 1 is an example of a computer network.

The invention relates to a method and system for detecting and communicating the presence of one or more users on a computer network. In the context of the invention, presence information describes any data that specifies the availability, proximity, activity level or operating state of a computing device or corresponding user of the device from over the network. For example, presence information can be provided to a user of a computing first device (a watcher) in the form of a presence document, and analyzed by watcher to determine if a user of another computing device (a registered device user) is online or offline, busy or idle. This determination is dependent on various factors, including the current activity of the user being maintained, the present operating state of the computing device of the user being monitored, etc. In an effort to stay consistent with common terminology used in the computing industry, this detailed description will use the term "presence" synonymously with the term "presence information" at various times. Moreover, the terms "presence" or "presence information" should be interpreted as relating to the user, or one or more devices employed by the user.

Also, the invention will be described throughout the course of the description with respect to SIP as a messaging protocol for supporting communication between devices in accordance with the teachings of the invention. Once again, those of skill in the art will recognize that SIP is only one protocol suitable for supporting network telephony and presence, and that other protocols may just as easily be utilized. Other such protocols include the H.323 standard and the Single Computer Telephony Protocol (SCTP). The invention is not limited to any one protocol or messaging implementation, as any means or medium by which two or more devices may communicate to support network telephony applications is suitable. Furthermore, the invention is not limited to any particular network telephony configuration, as any means for exchanging messages between one or more computers via SIP or the like is suitable for use in connection with the invention. This includes network configurations where computing devices such as proxies, redirect servers, registration terminals, presence servers and agents, and one or more clients or "presentities," are involved in the communication.

As used herein, the term "network telephony" relates to any process wherein a network, such as the Internet, is used as a transmission medium for placing telephone calls or facilitating multimedia sessions between two or more computing devices. This can include multimedia sessions where streaming media (e.g., audio and video data) is exchanged over the network, conference calls, virtual meetings, and other telephony sessions. The term "network telephony" is generic, and can therefore describe or pertain to several other communication processes involving the exchange of packetized data. These include, but are not limited to, IP telephony, Voice over the Internet (VOI) and Voice over IP (VoIP). Also, as used herein, the term "call" (e.g., telephone call) relates to a session in which an exchange of information is commenced or initiated between two or more computing devices over a network, such as with the aide of a telephony application (e.g., MICROSOFT NETMEETING™). In the context of the present invention, a "call" is synonymous to a "message" being sent between devices, and those terms will be used interchangeably at times to describe the interaction between two or more devices over the network.

An example of a networked environment in which the invention may be used will now be described with reference to FIG. 1. The example network environment includes multiple computers 20 communicating with one another over a network 30, such as the Internet, as represented by a cloud. The network 30 may include many well-known components, such as routers, gateways, hubs, etc. and may allow the computers 20 to communicate via wired and/or wireless media.

Figure 2:
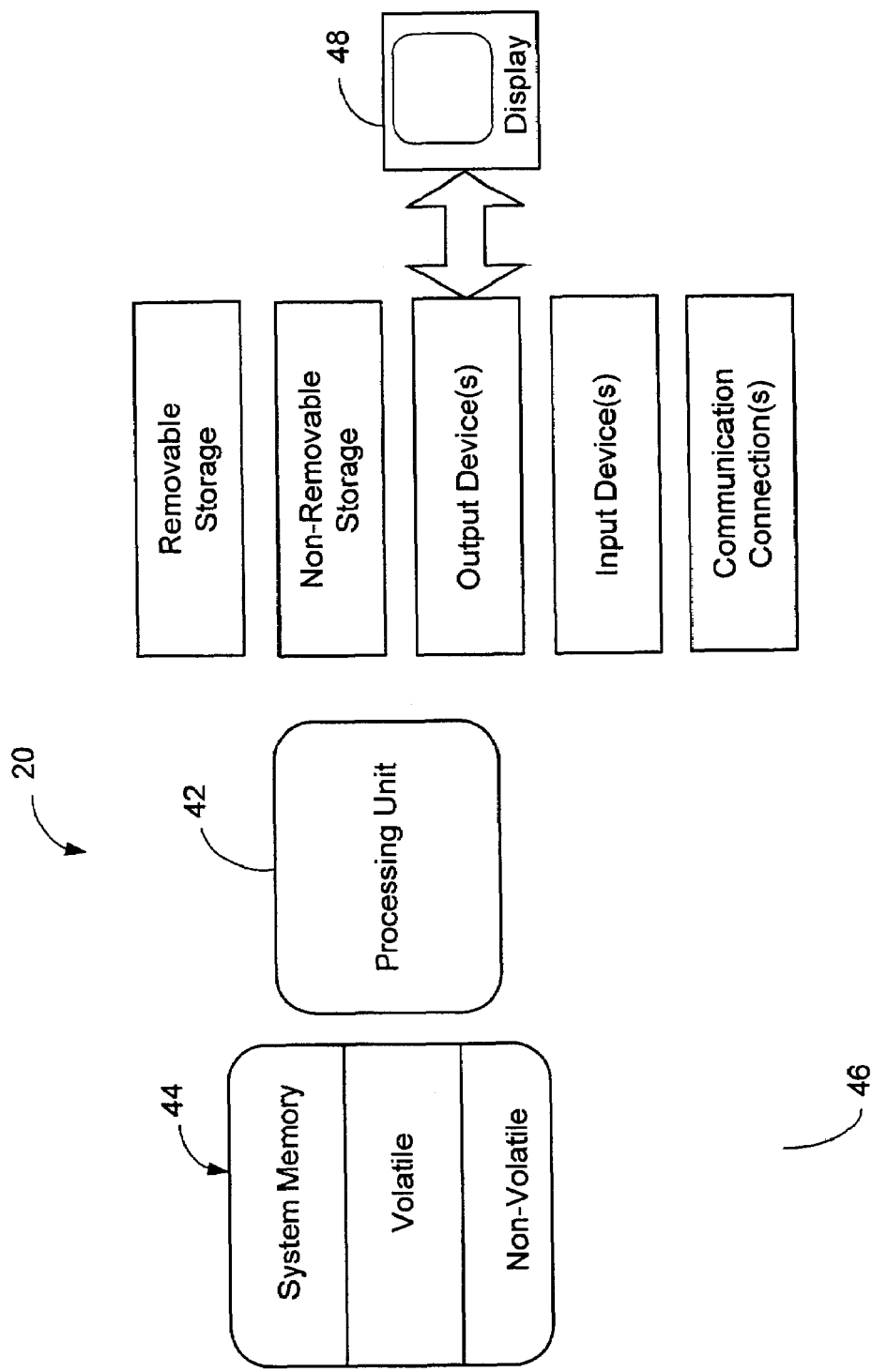
FIG. 2 is an example of a computer.

Referring to FIG. 2, an example of a basic configuration for a computer on which the system described herein may be implemented is shown. In its most basic configuration, the computer 20 typically includes at least one processing unit 42 and memory 44. Depending on the exact configuration and type of the computer 20, the memory 44 may be volatile (such as RAM), non-volatile (such as ROM or flash memory) or some combination of the two. This most basic configuration is illustrated in FIG. 2 by dashed line 46. Additionally, the computer may also have other features/functionality. For example, computer 20 may also include additional storage (removable and/or non-removable) including, but not limited to, magnetic or optical disks or tape. A computer-readable storage medium includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 20. Any such computer storage media may be part of computer 20.

Computer 20 may also contain communications connections that allow it to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 20 may also have input devices such as a keyboard, mouse, pen, voice input device, touch input device, etc. Output devices such as a display 48, speakers, a printer, etc. may also be included. All these devices are well known in the art and need not be discussed at length here.

Figure 3:
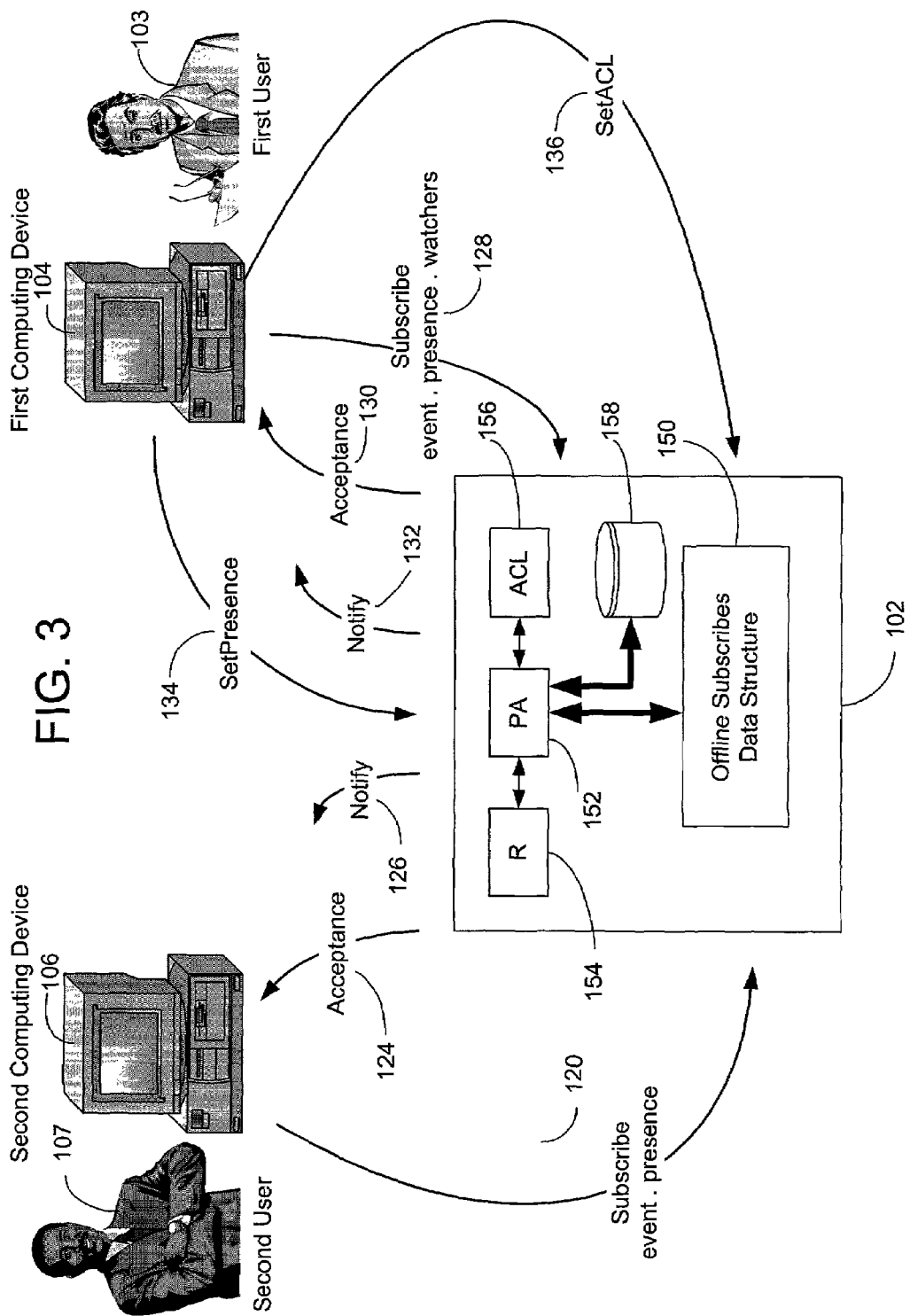
FIG. 3 is a diagram illustrating a server facilitating a call between a first computing device and a second computing device over the network in accordance with an embodiment of the invention.

In accordance with an embodiment of the invention, a server provides presence information regarding a first computing device, which is registered with the server, to a second computing device which operates as a watcher, as illustrated in FIG. 3. The server, labeled 312, is a computing device that is capable of processing messages conforming to a protocol for supporting telephony (e.g., SIP, H.323). The first computing device, labeled 104, and the second computing device labeled 316 are devices capable of communicating with one another over a computer network using network telephony. A first user 313 uses the first computing device 104, while a second user 317 uses the second computing device 316. In order to support the communication of presence information, the server 312 includes various components, such as a program referred to as a presence agent (PA) 152, a registration program (R) 154, and an access control list (ACL) 156. The presence agent 152 receives requests for presence information from one or more computing devices that act as "watchers," responds to the requests, and generates notifications of changes in the presence of computing devices being "watched". To maintain that presence information, the server 312 includes a memory 158 for storing the data. The registration program 154 processes registration request messages (e.g., an SIP REGISTER messages) received from over the network. Registration messages are sent to the registration program 154 by computing devices that are new to the network, and serve to "introduce" such new devices to the presence agent program 152. A computing device that executes a registration program or has similar functionality may be referred to herein as a "registrar." Operating in connection with the presence agent 152 and registration program 154 is the access control list 156. The ACL 156 may be implemented as a data structure, database, or even as a program, and is referenced by the server 312 to allow the server 312 to determine how it is supposed to interact with other devices on the network.

As shown in FIG. 3, the first user 313 operates the first computing device 104 to establish register with the server 312. The registration program 154 handles this registration process. In some embodiments, the registration program 154 is implemented as a dedicated computing device known as a registrar (not shown), which operates in conjunction with a proxy server that handles SIP messages. Any mechanism by which the first user 313 may register one or more devices in order to facilitate network telephony services, and particularly the communication of presence information, is within the scope of the invention.

The first computing device 104 executes a program, referred to as a presence user agent (PUA) that generates presence information relating to the first user 313. The PUA may be implemented on hardware/firmware as part of a stand-alone program or operating system. It may also be implemented as part of other software applications such as e-mail utilities, instant messaging software, network monitoring programs, video/audio conferencing programs, etc. When the second user 317 wishes to gain access to the presence information of the first user 313, the second user 317 interacts with the second computing device 316 to generate a SUBCRIBE message. The second computing device 316 sends the message to the server 312 (event 320). The SUBSCRIBE message alerts the server 312 that the second user 317 wants to "subscribe" as a watcher of the first computing device 104 and the corresponding first user 313. In various embodiments of the invention, the subscribe message contains an event header that specifies presence as the basis for the subscription request (e.g., event.presence). The event header causes the presence agent 152 to initiate a call to the server 312 to process the message as a presence subscription (as opposed to some other type of network event). In response to the subscription request, the server 312 (acting as a presence agent on behalf of the first computing device 104) stores the contents of the request into a data structure 150, referred to as an offline subscribes data structure. The offline subscribes data structure 150 is implemented as a file, record, table, index or any other scheme or mechanism for organizing data. Subscription information pertaining to each subscriber (e.g., URI, network address information of the subscriber) is stored in the offline subscribes data structure 150, allowing it to act as a persistent record of the subscription requests. In this way, the subscription information is maintained so as to be readily accessible to the presence agent 152.

After the subscription request is stored into the offline subscribes data structure 150, the server 312 makes a determination as to whether to accept the subscription request. This determination is made according to rules or conditions defined by the first user 313, which are maintained in the access control list (ACL) 152. In general, the ACL 152 includes access preferences that informs the server 312 as to which permissions, or access rights, a particular user or group of users has with respect to a particular resource—in this case, the presence information related to the first computing device 104 and first user 313. The actual settings of the ACL 152 as defined by the first computing device 104 will be described in a later section of this description. When the subscription message is accepted, the presence agent 152 generates an acceptance message, such as a SIP 202 message (event 324) and a NOTIFY message (event 126), which the server 312 sends to the second computing device 316. For standard telephony protocols such as SIP, the body of the NOTIFY message contains the presence information of the first computing device 104 and/or of the corresponding first user 313. If the presence agent 152 rejects the request, the presence agent 152 generates an acceptance message (e.g., a SIP 202 message) in the same manner as when the request is accepted. However, the server 312 does not send presence information to the second computing device 316, but rather sends a NOTIFY message containing no presence information. As a result, the second user 317 is allowed to subscribe as a watcher of the first user 313, but does not gain access to the presence information.

According to an embodiment of the invention, access to presence information pertaining to the first user 313 and/or the corresponding first computing device 104 is limited only to those users specified by the ACL 156. Since the server 312 accepts all subscription requests, access to the presence information of the first computing device 104 and/or the first user 313 is not dependent upon the first computing device 104 or first user 313 actually being present. In other words, it is possible for the first computing device 104 or first user 313 to not be present upon the network (e.g., logged off, disconnected, or in a busy state) without jeopardizing the ability of another device to subscribe as a watcher. In conventional systems, the absence of the first computing device 104 results in all SUBSCRIBE requests received by the server 312 being rejected. Consequently, in such systems the watcher must resubmit the request periodically until the subscription is finally accepted. Obviously, this is not desirable as this phenomenon increases the amount of traffic to be handled by the server 312, and, ultimately reduces its scalability.

The server 312 overcomes this challenge through the use of the offline subscribes data structure 150. When the first computing device 104 and the first user 313 resume their activity upon the network after having previously not been present upon the network, the first computing device 104 sends a SUBSCRIBE request to the server 312 to obtain any data stored in the offline subscribes data structure 150 (event 128). This subscribe request differs from the subscription request transmitted by the second computing device 316 for obtaining presence information (event 320). In that, the subscribe message sent by the first computing device 104 indicates to the server 312 that the first computing device 104 wishes to determine which other devices, if any, have attempted to monitor its presence or that of the first user 313 during the offline period. In response to this request, the server 312 accesses the offline subscribes data structure 150, extracts the data, and forwards an acceptance message to the first computing device 104 followed by a NOTIFY message (events 130 and 132). The body of the NOTIFY message contains the data from the offline subscribes data structure, such as a list of the subscribers and their corresponding network address information. Armed with this information, the first computing device 104 is able to recognize all of the computing devices and users that subscribed as watchers during the time it was not present on the network.

Once the first computing device receives the list of subscribers obtained from the offline subscribes data structure, the first computing device 104 and/or the first user 313 determines whether to accept or reject the subscription requests. The first user 313 makes this determination by responding to message prompts generated to a display screen 110 of the first computing device 104 by a presence enabled program (e.g., the PUA). In this scenario, the first user 313 responds using an input device such as a mouse or keyboard. Subscription requests can also be accepted or rejected by the first computing device 104 automatically, without user intervention, according to the preferences or auto-settings of the first computing device 104. When a subscription request is accepted, the first computing device 104 generates an updated presence document, which is a file that contains the presence information, and forwards it to the server 312 (event 134). The presence agent 152, operating on the server 312, processes the contents of the presence document, and stores the presence information obtained from the document into an accessible memory location 158 for subsequent retrieval. Also, upon receiving the presence information, the ACL 156 is updated to indicate that the second user 317 has been permitted to act as a watcher of the first computing device 104 and the first user 313 (event 136). As such, the second computing device 316 may freely access the presence information of the first computing device 104 and first user 313. On the other hand, if the subscription is not accepted, the ACL 156 is updated to indicate that the second user 317 is not to have access to the presence information (event 136). No subsequent NOTIFY message is sent to the second computing device 316 in this case, ensuring that the second user 317 is not aware of the presence of the first computing device 104 or first user 313.

The invention may be implemented with a variety of features. According to some embodiments, these features are made possible through the use of one or more executable extension modules, which operate upon a client computing device to ensure the effective communication of a user's presence. The extension modules are implemented as, for example, DLLs (dynamic link libraries). Each of these features is described in the following sections, with appropriate reference to FIGS. 4-5.

Figure 4:
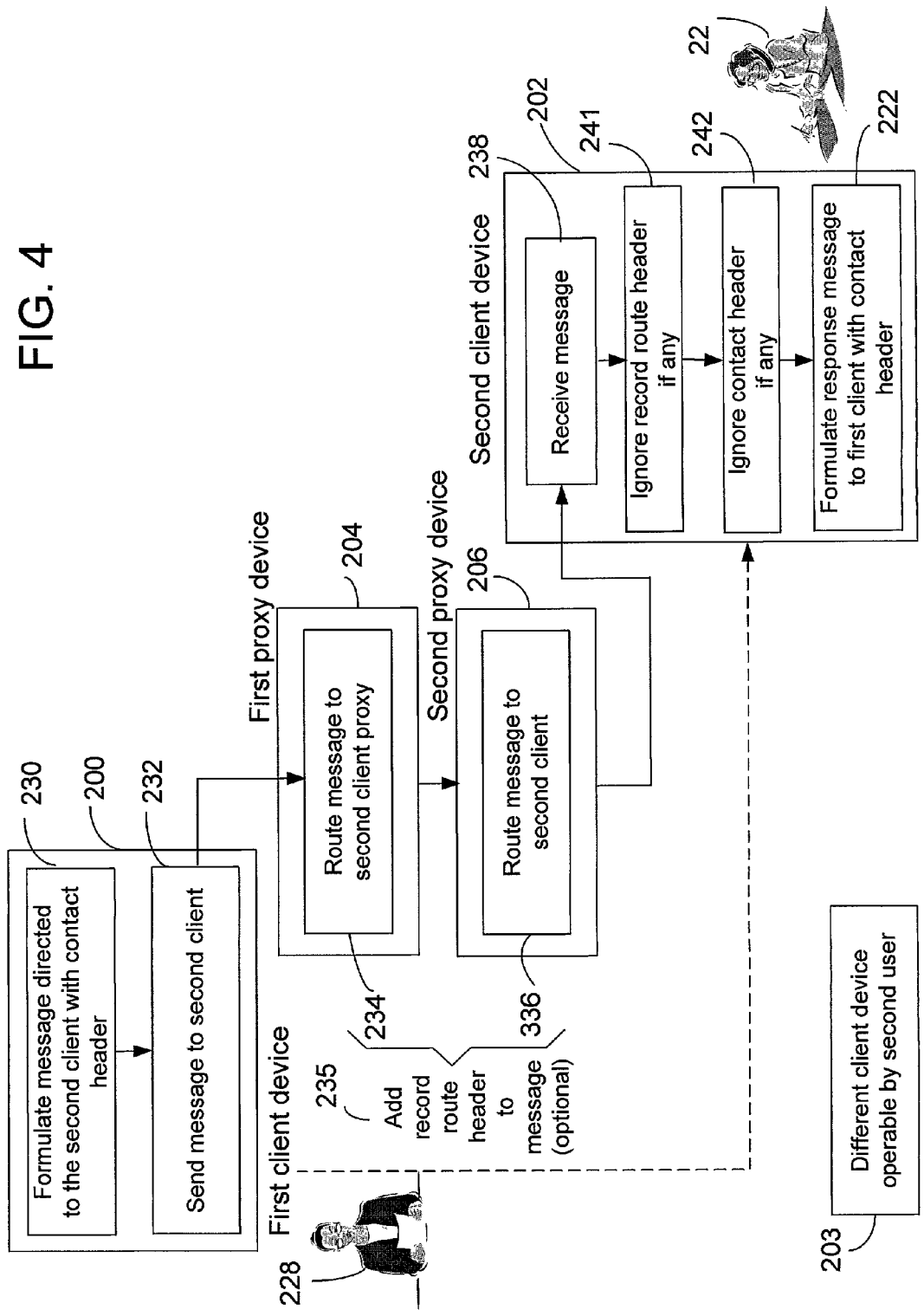
FIG. 4 is a diagram illustrating how headers added by proxy devices are handled in an embodiment of the invention.
Figure 5:
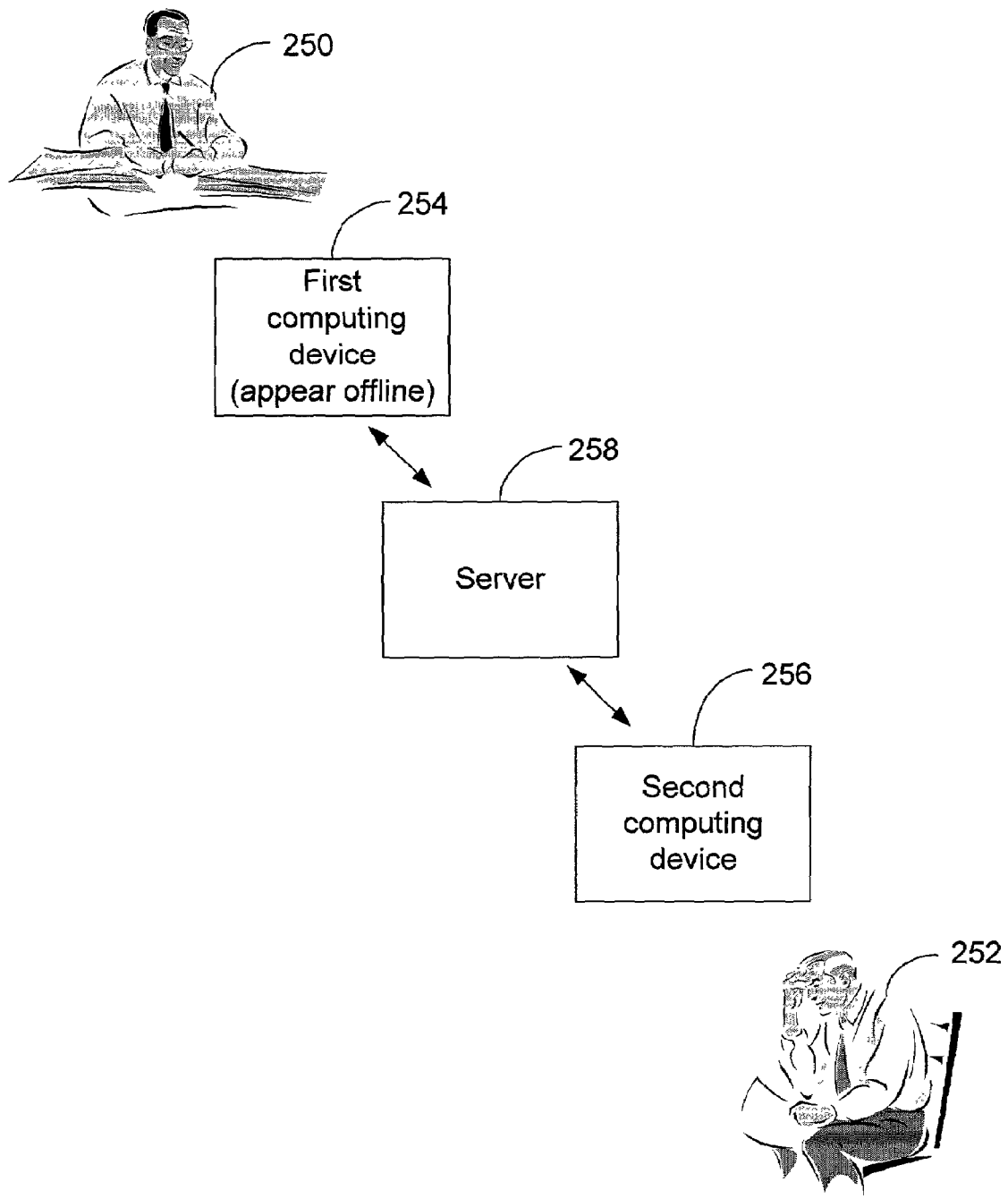
FIGS. 5-9 illustrate possible features of the invention.

An example of how header information that gets tacked on by proxy devices is handled in an embodiment of the invention will now be described. Referring to FIG. 4, a first client device 200 is communicatively linked to a first proxy device 204. The first client device 200 is being used by a first user 228. Similarly, a second client device 202 is communicatively linked to a second proxy device 206. The second client device 202 is being used by a second user 226. It is assumed in this example that the first and second proxy devices 204 and 206 are acting as gateways for their own respective corporates LANs. The first proxy device 204 and the second proxy device 206 are capable of communicating with one another of the Internet. It is further assumed that the first user 228 will attempt to become a watcher of the second user 226 and of the second client device 202. When the first client device 200 sends a request message to the second client device 202, the first client device 200 adds a contact header to the request message and forwards the message to the first proxy device 204 (events 230-232). A contact header is a data field or bits of data added to a request message for indicating the first client device's IP address. The first proxy 204 routes the request to the second and the second proxy device 206 forwards the request message to the first proxy device 204 (events 234-236). During the transmission of the message, either the first proxy device 204 or second proxy device 206 may add a record-route header, which indicates to the first client device 200 that any subsequent request messages are to be sent along the same path as the request message that was initially record-routed.

In accordance with an embodiment of the invention, the timing out that is sometimes caused by the use of the route-record headers is avoided. Specifically, when the first or second client devices 200 and 202 receive a message that includes a record-route header, as added by the corresponding proxy devices 204 or 206, the record-route header information is ignored. Also, the first and second client devices ignore any contact header information indicated. In this way, request messages such as SIP SUBSCRIBEs, are always sent to the proxy device corresponding to the sending device.

For example, when the second client device receives a message that has a record-route header (event 238), the second client device 202 ignores the record-route header and contact header indicating the IP address of the first client device 200 (events 240 and 242). Because the record-route header and contact header information is ignored, the predetermined network path for messaging established by the record-route indicator is eliminated. Thus, if the user 226 of the second client device 202 logs off of the second client device 202 and onto the Internet from a different client device 203, the user's 226 presence status is never delayed.

Handling Incoming Calls in the 'Appear Offline' Presence Mode

As is well known in the art, the 'Appear Offline' presence state ensures that a user of a computing device appears offline or not present to one or more watchers. For example, in FIG. 5, a first user 250 appears offline to a watcher 252 when operating in 'appear offline' mode regardless of whether or not the first user 250 is present with respect to the first computing device 254. However, if the second user 252 ignores the offline appearance of the first user 250 and sends a request message anyway (e.g., audio session request), the second user can infer whether the first user 250 is really present or not based on the response generated for the request.

This phenomenon occurs because the request is generally routed first to a server device 258 that acts on behalf of the first computing device 254 to process request messages (e.g., proxy or SIP server). When the server 258 receives the request message, it checks to see if the first user is online. If the first user 250 is offline, it sends a "temporarily unavailable" message to the second computing device 256. For SIP messaging, this corresponds to a SIP 480 response message. Because the temporarily unavailable message is received from the server 258 acting on behalf of the first user 250 versus from the user's computing device 254, the second user 252 can assume or guess that the first user 250 is acting in an appear offline mode. If, however, the response were generated directly by the first computing device 254 at all times, the ability for the second user 252 to infer the presence of the first user 250 is limited.

Figure 6:
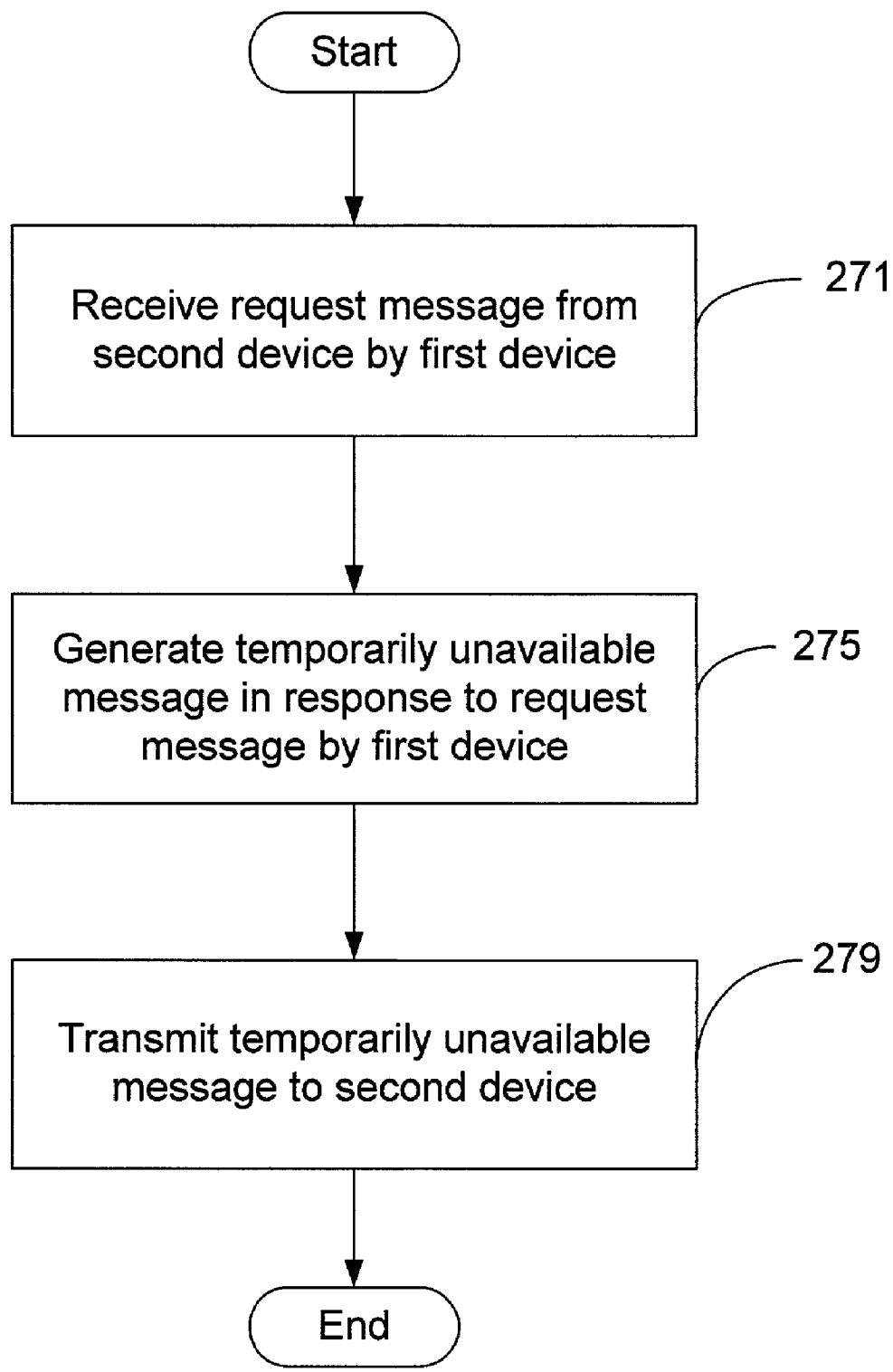

In accordance with an embodiment of the invention, the first computing device 254 operating in an 'appear offline' mode is able to restrict the second user's 252 ability to infer the presence of the first user 250, as illustrated in flowchart of FIG. 6. Specifically, when the second computing device 256 sends a request message to the first computing device 254 (event 271), the first computing device responds to the message in the same manner as a server acting on behalf of the first user 250. As such, the first computing device 254 generates a temporarily unavailable message (e.g., SIP 480 response message), and transmits this to the second computing device 256. This corresponds to events 275 and 279 respectively. Because the second client device itself handles the response, the ability for the second user 252 to deduce that the first user 250 is only appearing online is significantly limited.

Handling Subscription Messages after a Crash

Figure 7:
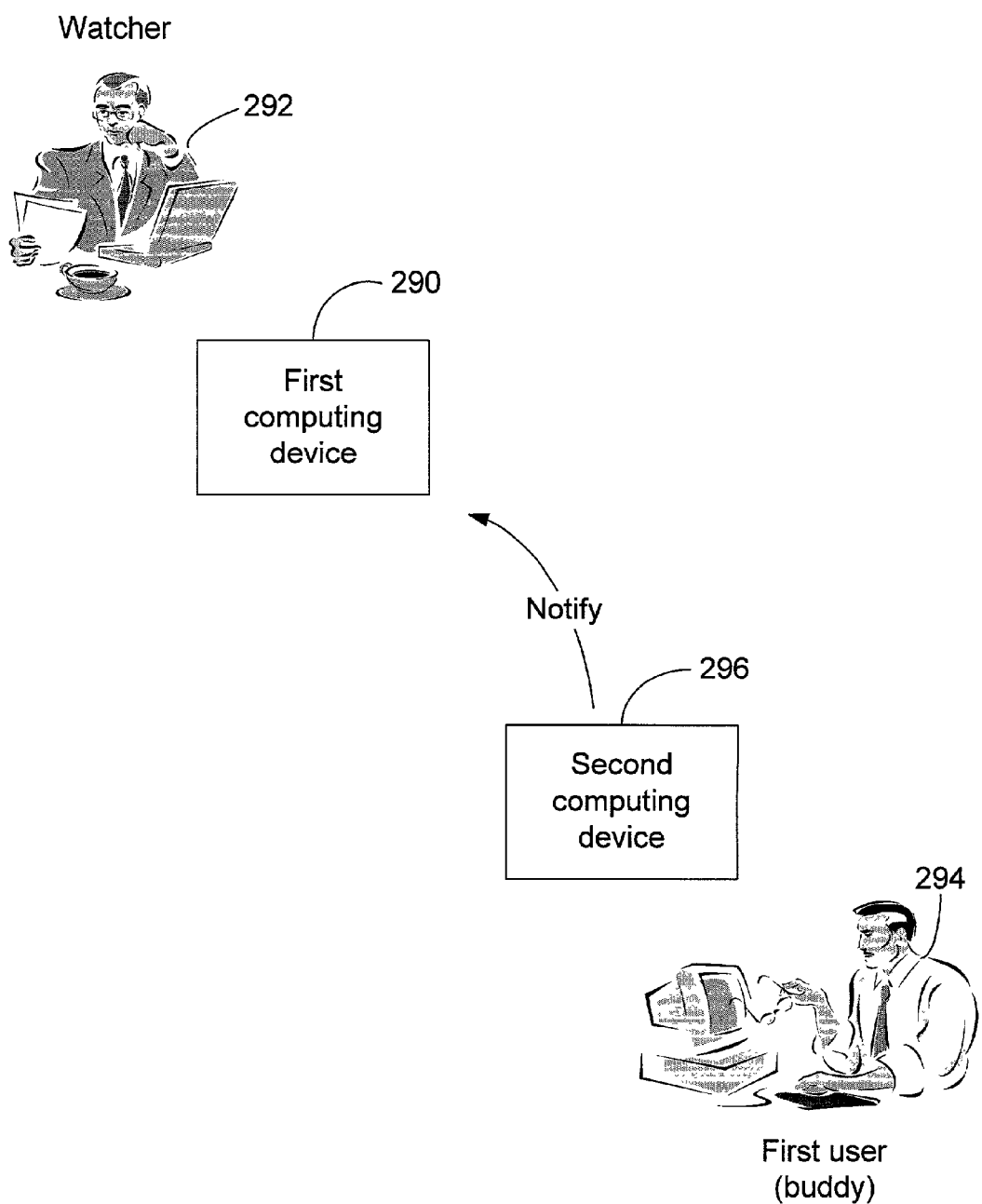

In FIG. 7, a first computing device 290 capable of transmitting and receiving presence information is shown. A watcher 292 that is subscribed to receive presence information pertaining to a first user 294 listed as one of the watcher's buddies operates the first computing device 290. The presence information is presented to the buddy list maintained by the computing device 290 via notification messages, such as SIP NOTIFY messages, sent by a second computing device 296. When the first computing device 290 receives these notification messages from the first user 294, each notification message generally specifies a CSeq header value that is increased by one for each subsequent notification.

If for a given NOTIFY message the wrong CSeq value is indicated, the first computing device 290 rejects the NOTIFY by sending an error response message (e.g., SIP 250 Response) to the buddy 294. The CSeq value is incorrect in various cases including when the second computing device 296 unexpectedly crashes. With the incorrect value indicated due to crashing of the second computing device 296, the first user 294 is unable to determine what Cseq value to use in the next notification message it sends and thus has to reset or terminate the watcher's 292 subscription to the presence of the buddy 294. For SIP messaging, this can be accomplished by sending a NOTIFY:0. Unfortunately, every NOTIFY:0 may cause the watcher 292 to mark the first user 294 as offline, even though this is may not be the case. Hence, the watcher 292 is unable to maintain reliable presence information pertaining to the first user 294 in the event of the second computing device 296 crashing.

Figure 8:
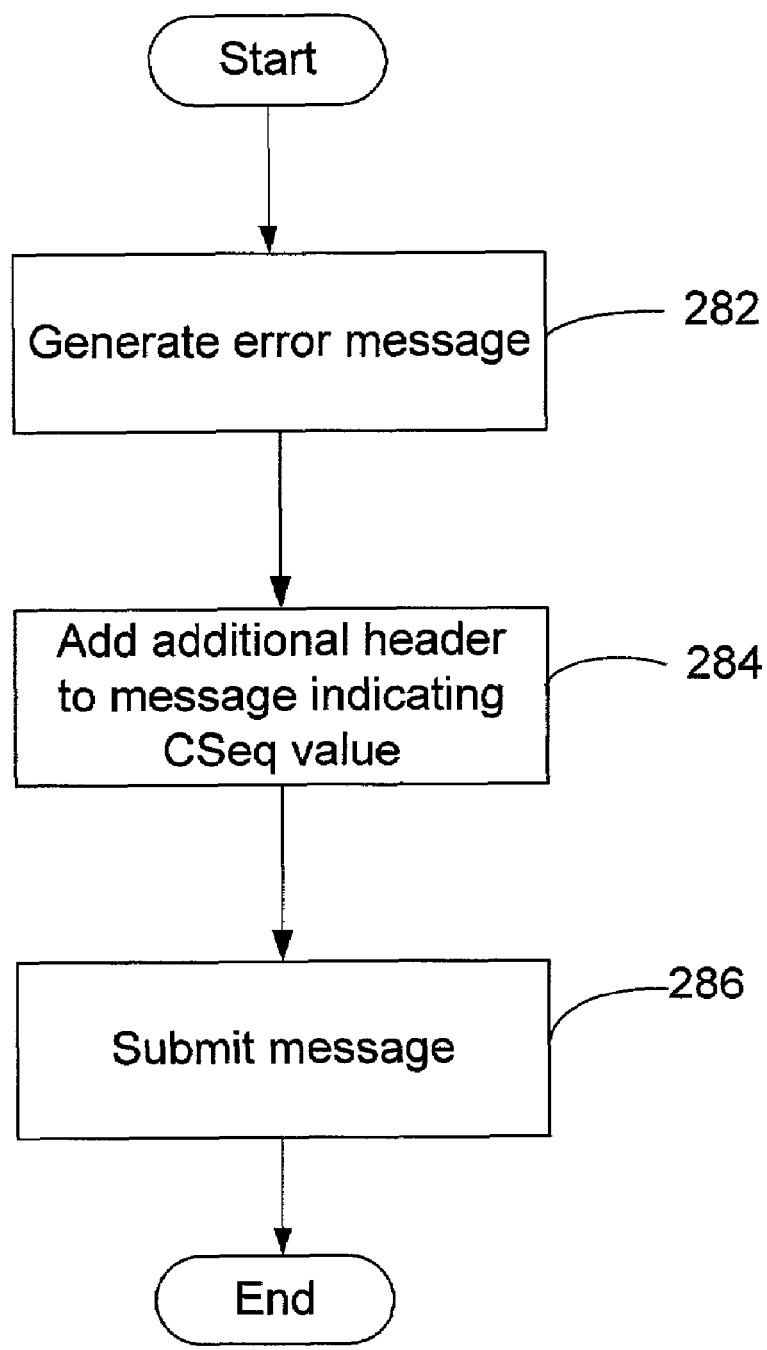

In accordance with an embodiment of the invention, a watcher is capable of generating accurate presence information pertaining to a first user in the event of the first user's computing device crashing or generating an incorrect CSeq, as illustrated in the flowchart of FIG. 8. "Crashing" refers to any event that causes a disruption in the generation or processing of presence information by the first user. This includes, but is not limited to, network disconnections, processing errors that affect the operation of the first computing device, etc.

When the CSeq value is incorrect, such as due to a crash, the watcher generates an error message (event 282). The watcher then adds an additional header to the message to indicate to the first computing device what the expected CSeq value is to be for the subsequent notification messages generated by the first user's computing device (event 284). The syntax for this additional header is Expected-headerValue: #. This error message with the additional header is then sent to the first user's computing device (event 286), allowing the first user's computing device to be aware of the next required CSeq value.

Immediate Re-Subscribe after an Empty Notification Message

Current computing systems for performing presence processing don't expressly specify what a watcher should do upon receiving a notification message having no relevant presence data. For SIP messaging, this type of notification message is called a NOTIFY:0, where the zero indicates the presence data related to the notification is NULL or empty. In conventional systems, the only requirement with respect to watchers that receive a NOTIFY:0, or the like, from a user and corresponding device being watched is that they re-SUBSCRIBE on a regular basis. The length of a subscription is typically on the order of minutes or hours. For example, a subscription may be required to be renewed every 25 minutes. So, based on this behavior, the watcher may have to wait up to 25 minutes before it can access the actual presence of a user it is watching.

Figure 9:
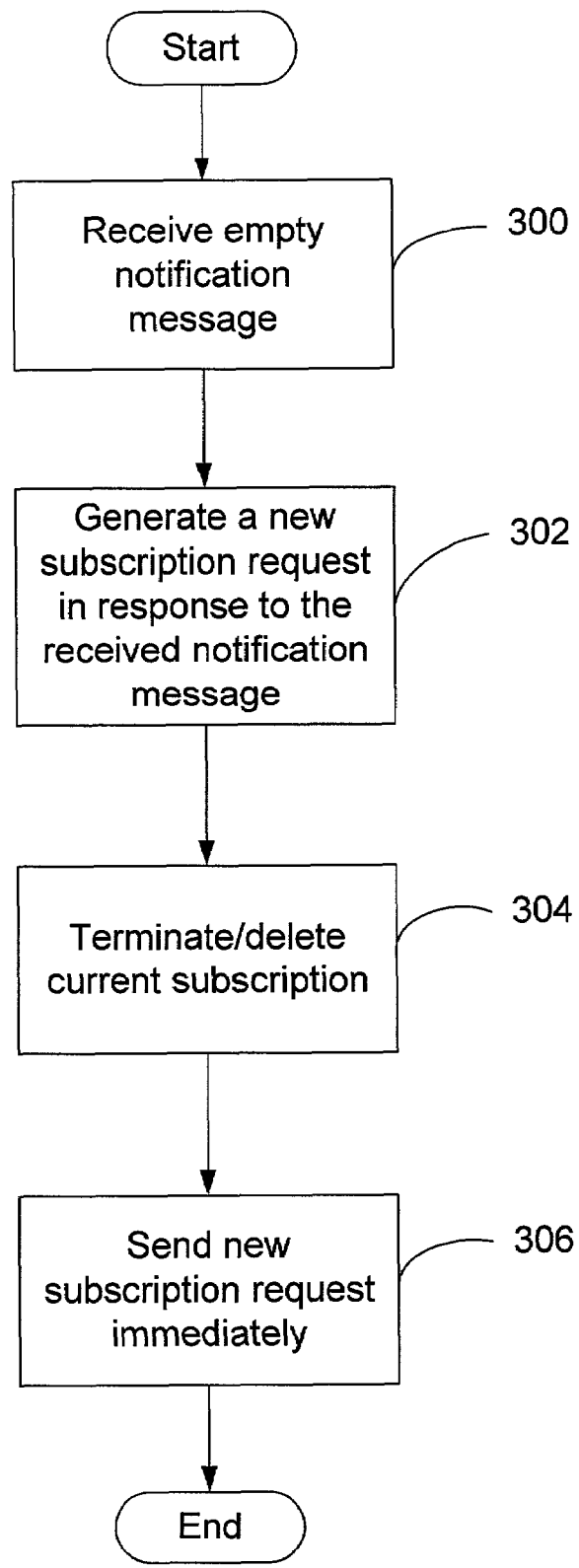

In accordance with an embodiment of the invention, a computing device sends a re-SUBSCRIBE immediately after receiving a NOTIFY:0 instead of sending the next re-SUBSCRIBE after a set time interval, as illustrated in the flowchart of FIG. 9. Specifically, when the computing device receives the empty notification message from another computing device (event 200), it generates a new subscription message directed towards the device that transmitted the empty notification (event 302). The current subscription is then terminated (event 304), and the new subscription message is immediately sent to the address from whence the empty notification was received (event 306). By 'immediate,' it is meant that the subscription is sent (event 306) in an amount of time much less than the normal timeout interval, which is usually 25 minutes.

The immediate re-subscription process ensures that a watcher that receives an empty notification is able to obtain presence status information for a user it is watching immediately after the user chooses to make the information available again (e.g., the user being watched comes back online again, the user being watched unblocks the watcher). Also, when the user being watched is in 'appear offline' mode, a NOTIFY:0 is sent to the watcher. However, the immediate re-subscription process prevents the watcher from having to wait a set interval of time to finally re-SUBSCRIBE and receive the most current presence information.

Transferring the Functions of the Presence Agent

Figure 10:
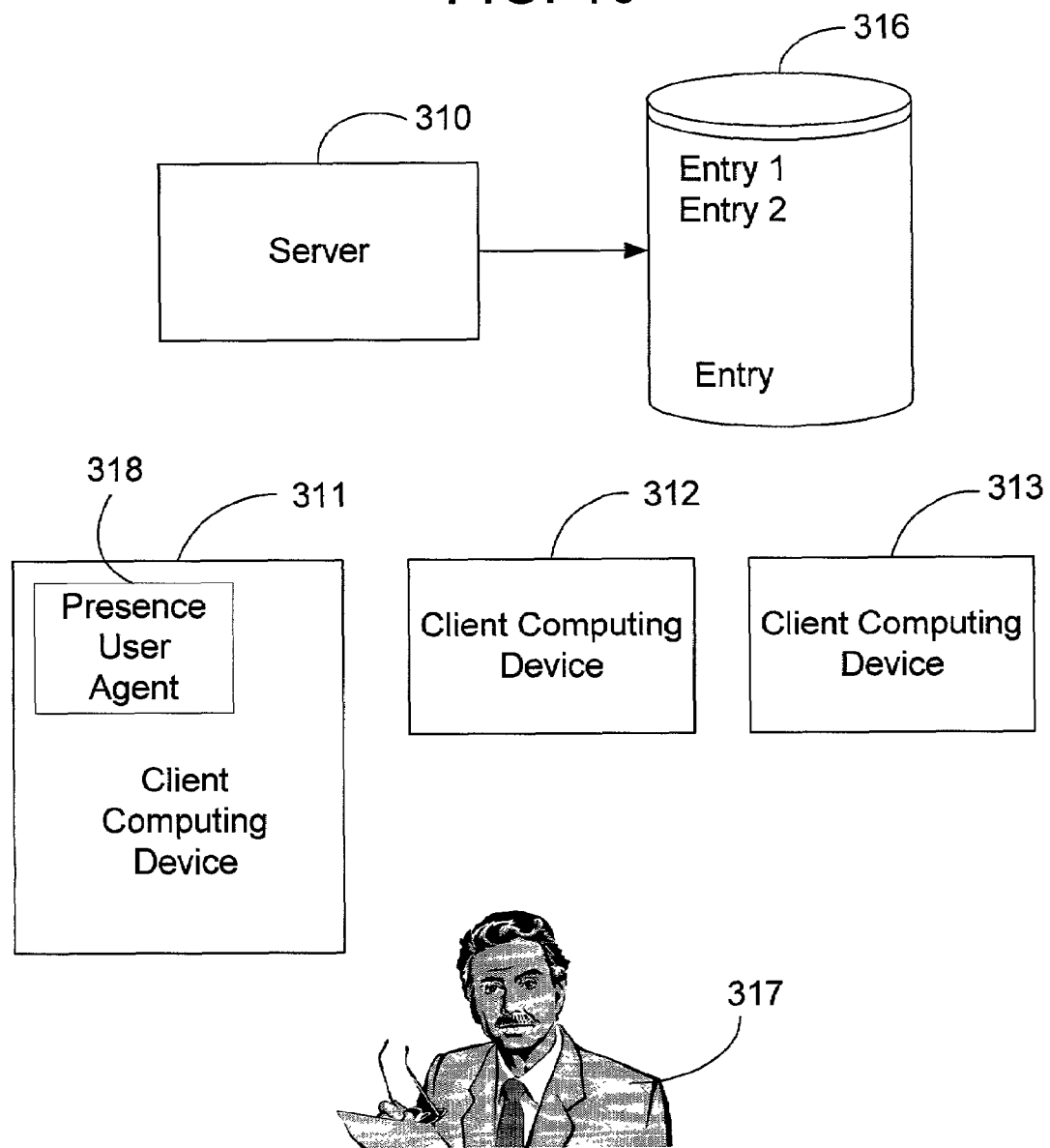
Figure 11:
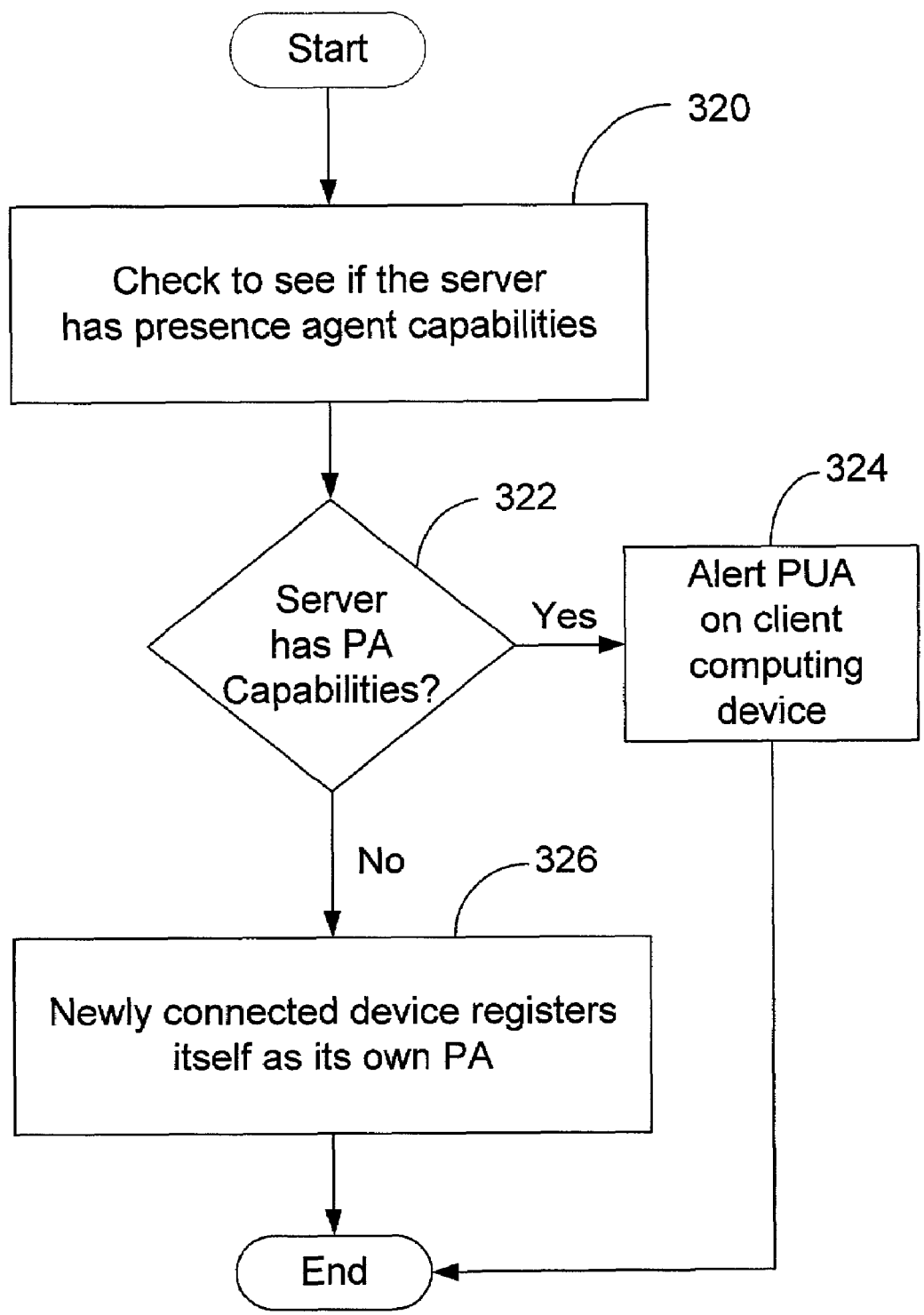

In accordance with various embodiments of the invention, at least the functions of the presence agent 152 (FIG. 11) may be performed by a client device, such as the first computing device 104 or the second computing device 106. This is useful in those situations where the server 102 does not have a presence agent program, or where it has a presence agent program but is experiencing technical difficulties. Referring to FIGS. 10 and 11, an example of how a client computing device can assume the role of a presence agent will now be described. FIG. 10, a server 310 is communicatively linked to a network that includes first, second and third client computing devices 311, 312 and 313.

In this example, the newly connected client computing device 311 registers with the server 310. The first client computing device 311 executes a program referred to as a presence user agent and labeled 318. The presence user agent 318 has many of the same capabilities of the as the presence agent 152 of FIG. 3. It is assumed in this example that computing devices 312 and 313 have already registered with the server 310. The server 310 is a computing device that is capable of processing messages conforming to a protocol for supporting telephony (e.g., SIP, H.323). In its capacity as a registrar, the server 310 processes registration request messages (e.g., an SIP REGISTER message) received from the first client computing device 311, and establish as a registration entry for the device in a registration database 316. The registration entry may include the network address of the first client device 311, and a URI (uniform resource indicator) or name pertaining to the user 317 of the first client computing device 311.

When the first client computing device 311 registers with the server 310, it performs a check to determine if the server 310 also functions as a presence agent. Such a determination can be made by accessing the registration database 316, or by some other means. This process corresponds to events 320 and 322 of the flowchart of FIG. 11. If an entry in the registration database 316, or other indicator specifies that the server 310 is a presence agent, the first client computing device informs the presence user agent (PUA) 318 that the PUA 318 is to allow the server to handle the functions of informing other devices of the presence of the first client computing device (event 324). These functions include processing tasks such as responding to subscription messages received from watchers, transferring presence documents to watchers, and other functions related to the conveyance of the user's 317 presence.

On the other hand, if the first client computing device 311 determines that the server 310 does not or cannot act as a presence agent, the first client computing device 311 registers with the server 310 as a presence agent on its own behalf. In this case, the presence processing tasks corresponding to the user 317 are handled directly by the presence user agent 318. This action corresponds to event 326 of the flowchart of FIG. 11. In its capacity as its own presence agent, the first client computing device is able to respond to requests from users of other devices, such as the user 318 of the second client computing device 313, for access to its presence information. In some embodiments, such requests are made by way of an SIP SUBSCRIBE message, which the watcher transmits to the acting presence agent; in this case, the presence user agent 318. Hence, the SIP messaging process (e.g., notification and acceptance process) employed to facilitate the delivery of a presence document pertaining to the user 317 and corresponding client device 311 is performed without the intervention of the server 310.

Referring again to FIG. 10, those skilled in the art will recognize that the process of checking the registration database 316 is only one way for the first client computing device 311 to determine the capabilities and role of the server 310. Indeed, other methods may be employed by the first client computing device 311, such as by receiving a direct notification message from the server 310 or from the activation of an indicator upon the server 310. Also, it will be recognized by those skilled in the art that although the server 310, is acting as both a proxy and registrar, these two functions can be performed on separate machines. So, for example, the server 310 can act as a registrar for maintaining the registration database 316, while a different server may act as a proxy for the first, second and third client computing devices 311, 312 and 313. Indeed, the invention applies to various network configurations, and is not limited to any one.

In various embodiments of the invention, the functionality of a presence agent is transferable between computing devices to ensure the proper communication of presence information. This transfer process, referred to as presence agent transfer, is performed according to two different modes: Single Point of Registration (SPOR) and Single Point of Presence (SPOP) mode. Both of modes of operation are described in the following paragraphs, and with respect to FIG. 12 and the flowcharts of FIGS. 13 and 14.

Single Point of Registration Mode

Figure 12:
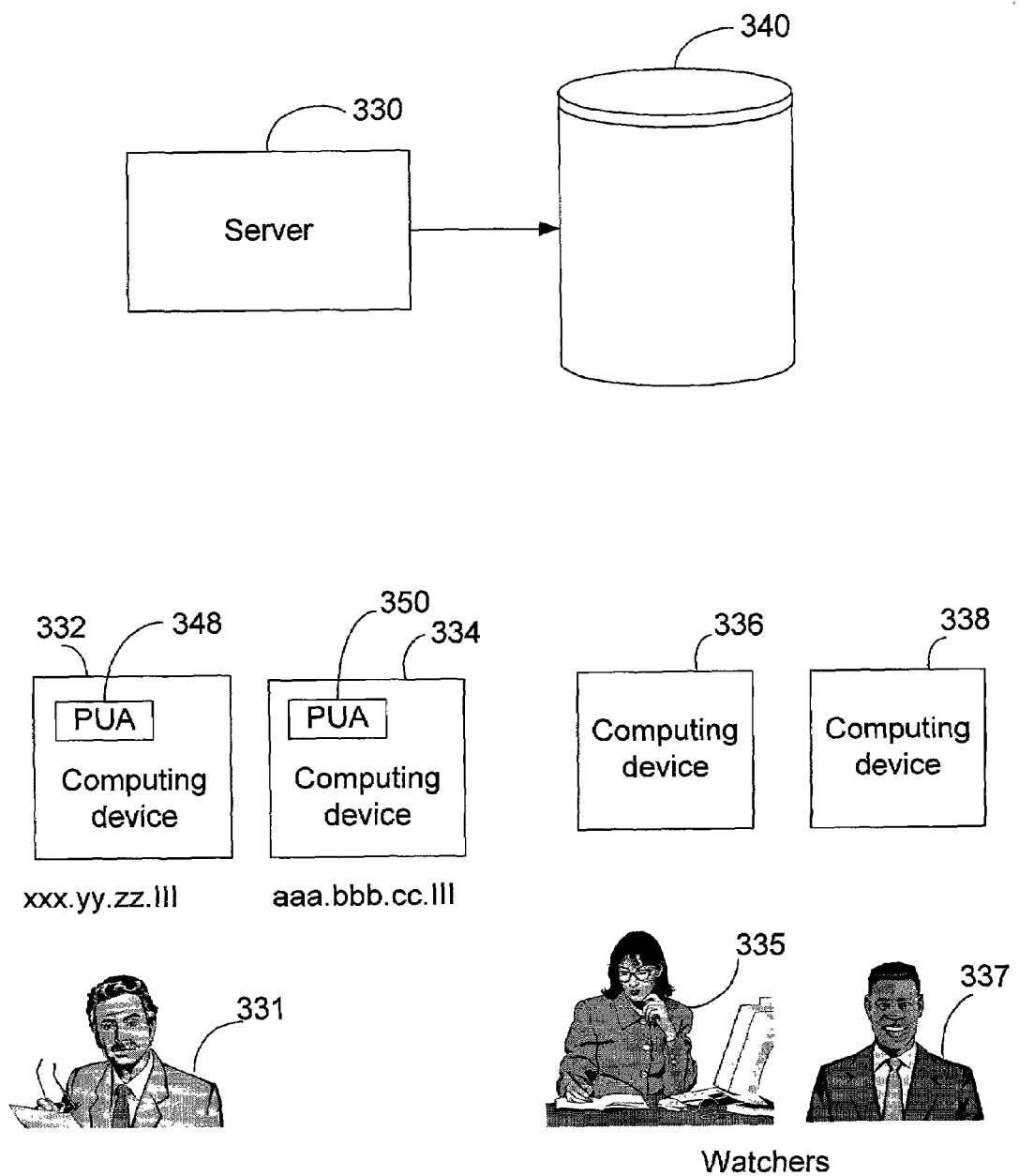

In FIG. 12, a server 330 capable of acting as a proxy and/or registrar for several computing devices 332, 334, 336, and 338 is shown. First and second computing devices, labeled 332 and 334 in the figure, are usable by a first user 331, while a third and fourth computing devices, 336 and 338 are usable by a second user 335 and third user 337 respectively. The first and second computing devices 332 are assumed to have IP address of xxx.yy.zz.111 and aaa.bbb.cc.111 respectively. The first computing device 332 executes a presence user agent (PUA) 348, while the second computing device 334 executes a presence user agent 350. The second and third users 335 and 337 are watchers of the first user 331, meaning they are able to subscribe to the presence of the first user 331 with a presence agent. When operating in the Single Point of Registration mode, the server 330 does not allow a user of multiple client devices, in this case the first user 331, to register upon the network from more than one client device at one time.

As an example of this mode of operation, consider a scenario in which the first user 331 is registered with the server 330 via the first computing device 332, and submits a new registration request via the second computing device 334 (e.g., SIP REGISTER request). Because the second computing device 334 is not yet registered, all SUBSCRIBE requests received from the third and forth computing devices 336 and 338 are received by the first computing device 332. When the server 200 receives the request from the second computing device 334, it checks its registration database 340 entries to determine if there is already another device registered for the first user 331. This corresponds to event 340 of the flowchart of FIG. 13. If, as a result of checking the database entries, the server 330 determines that another of the first user's devices is already registered, then that device is sent a message indicating that it is to deregister itself (events 342 and 344). In this case, a deregistration message is sent to the currently first computing device 332. An example of a deregistration message is as follows:

NOTIFY sip: xxx.yy.zz.111 SIP/2.0
Via: SIP/2.0/UDP aaa.bb.cc.111
From: <sip: registrar@someplace.com>;tag=b61d7c9a-6e2a-452e-8847-96ae9373d16b
To: <sip: current_registrant@someplace.com>;tag=6a1867fd-4be1-4f9c-8d94-ab845b683e79
Call-ID: 72ecae23-13a4-42d2-bd88-b3aec23ebc5b@172.31.88.64
CSeq: 1 NOTIFY
Event: registration-notify
User-Agent: Windows RTC/1.0
Content-Type: text/registration
Content-Length: 71
Deregistered; Contact: <sip: aaa.bb.cc.111; transport=tcp>

The deregistration message is a notification message, such as SIP NOTIFY, that is sent by the server 330 to the first computing device 332 via the registration session of that device. This NOTIFY message indicates its Call-ID as the REGISTER message that the first computing device 332 previously sent to the server 330 when it registered. Indicated in the Event header field of the message is the event type "registration-notify," which informs the first computing device 332 that the NOTIFY message relates to the registration process. Similarly, the Content-Type header field indicates a value "text/registration," and corresponding message body that has a first token as "Deregistered." The message body also indicates the Contact of the device that has replaced the first computing device 332 in the registration record—the second computing device 334 (corresponding to contact address aaa.bb.cc.111). The server 330 then creates an entry for the second computing device 334 (event 346).

In SPOP mode, whenever the server 330 receives a new registration request from a device associated with the first user 331 (e.g., SIP REGISTER request), the second computing device 334, for example, it determines whether this device is attempting to register as a presence agent on behalf of the first user 331. If so, the server 330 checks its registration database entries to determine if there is another device already registered for the first user 331. This corresponds to event 348 of FIG. 14. If another of the user's devices is already registered as a presence agent for the first user 331, then that device is sent a release subscription message (events 350-354). With respect to the first user 331, the recipient of the release subscription message is the second computing device 334. The release subscription message includes instructions that prompt the first computing device 332 to relinquish its role as a presence agent. An example of such a release message is as follows:

---

```
NOTIFY sip: xxx.yy.zz.111 SIP/2.0
Via: SIP/2.0/UDP aaa.bb.cc.111
From: <sip:registrar@someplace.com>;tag=b61d7c9a-6e2a-452e-8847-96ae9373d16b
To: <sip:current_registrant@microsoft.com>;tag=6a1867fd-4be1-4f9c-8d94-
ab845b683e79
Call-ID: 72ecae23-13a4-42d2-bd88-b3aec23ebc5b@172.31.88.64
CSeq: 1 NOTIFY
Event: registration-notify
User-Agent: Windows RTC/1.0
Content-Type: text/registration
Content-Length: 71
release-subscriptions; Contact: <sip: aaa.bb.cc.111 ;transport=tcp>
```

---

With respect to the first computing device 332, when it receives the deregistered message, its SIP stack its registration entries. The SIP stack of the deregistered device 332 also deletes its sessions with the second and third computing devices 336 and 338. The presence user agent 348 operating upon the client device 332 is then notified that the first client computing device 332 is no longer registered with the server 330. The watching devices—computing devices 336 and 338 receive an empty notification (e.g., SIP NOTIFY:0) message on their active buddy sessions, which prompts them to delete their existing presence sessions and establish new ones. Because of the deregistration process, however, the newly submitted SUBSCRIBE messages sent by the third and fourth computing devices 336 and 338 are received by the second computing device 334, as shown in FIG. 12. The PUA 350 executing on the second computing device 336 acts as the new presence agent for the first user 331.

Single Point of Presence Mode

Referring to FIG. 12a, and to the flowchart of FIG. 14, when operating in the Single Point of Presence mode, the server 330 does not allow the first user 331 to register from more than one client device as a presence agent. In this scenario, FIG. 12, the first computing device 332 is already registered as a presence agent for the user 331. As previously described, the first computing device 332 executing the PUA 348 can act as a presence agent in response to determining that the server 330 does not have presence processing capability.

The release-subscription message is a notification message, such as an SIP NOTIFY, that is sent by the server 330 to the first computing device 332. This NOTIFY message specifies the same Call-ID as the REGISTER messages previously sent from the first computing device 332, and specifies an event header with the event type "registration-notify." In specifying the event type as registration-notify, the first computing device 332 is aware of the context of the notification message. Also, the Content-Type header field indicates a value, "text/registration," and the first token of the message body is 'release-subscription.' Correspondingly, the message body also indicates the Contact of the device that is to be assigned to act as the presence agent for the first user 331, which in this case is the second computing device 334. Once this message is processed, an entry for the newly registered presence agent is established (event 356).

In some instances, the first user 331 may decide to UNREGISTER the first computing device 332 as opposed to attempting to register with the second computing device 334. When this occurs, an UNREGISTER message is sent to the server 200, which tells the server 330 to remove its entry for the first computing device 332 from its registration database 340. In response to the UNREGISTER message, the server 330 first checks its to see if the entry to be deleted is the device that is currently acting as the presence agent for the first user 331. If the entry to be deleted, or un-registered, is that of the device currently acting as presence agent for the first user 331, the server sends an 'Existing-PA-LoggedOff' message to all the other contacts registered for this user. An example of such a message is:

```
NOTIFY sip: 172.31.88.64:11862 SIP/2.0
Via: SIP/2.0/UDP 172.31.89.313:11584
From: <sip:kevin01@microsoft.com>;tag=b61d7c9a-6e2a-452e-8847-96ae9373d16b
To: <sip:kevin01@microsoft.com>;tag=6a1867fd-4be1-4f9c-8d94-ab845b683e79
Call-ID: 72ecae23-13a4-42d2-bd88-b3aec23ebc5b@172.31.88.64
CSeq: 1 NOTIFY
Event: registration-notifY
User-Agent: Windows RTC/1.0
Content-Type: text/registration
Content-Length: 22
```

Existing-PA-LoggedOff

Resultantly, the device that submitted the new registration request is allowed to act as a presence agent for the user.

As will be recognized by those skilled in the art, the SPOP mode of operation allows the presence agent functionality to be transferred from one computing device to another. This process can be used to transfer the presence agent functionality from one client computing device to another, as well as from a client computing device to a device operating as a server. In FIG. 12, the presence agent role can also be transferred to the server 330. This may be done by using the same message syntax described above. By receiving the presence agent functionality, the server 330 receives all subscription requests from any watchers on behalf of the user 331.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method in a client computing device for assigning presence agent functionality to the client computing device, the client computing device operating a presence user agent for generating presence information pertaining to a user, the method comprising:

determining if a server computing device has presence agent functionality;

when it is determined that the server computing device does have presence agent functionality, executing software for sending presence information pertaining to the user to the server computing device; and when it is determined that the server computing device does not have presence agent functionality, registering with a registrar as a presence agent on behalf of the user, wherein the client computing device receives subscription messages from watchers to subscribe to presence information of the user and transmits presence information to the watchers so that the client computing device functions as the presence agent for the user, rather than the server computing device.

2. The method of claim 1, further comprising the step of transmitting a registration request by the client computing device to a registrar.

3. The method of claim 1 wherein the step of determining includes checking a registration database maintained by the registrar for a presence agent registration entry associated with the server computing device.

4. The method of claim 3 wherein the server computing device operates as a registrar.

5. The method of claim 3 wherein the registrar is separate from the server computing device.

6. The method of claim 5, wherein information about the presence of the user is transmitted to watcher devices without the intervention of the server computing device.

* * * * *